(12) United States Patent
Morimoto et al.

(10) Patent No.: US 6,859,357 B2
(45) Date of Patent: Feb. 22, 2005

(54) PORTABLE INFORMATION APPARATUS

(75) Inventors: Jun Morimoto, Yokohama (JP); Satoshi Ooya, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 60 days.

(21) Appl. No.: 10/347,494

(22) Filed: Jan. 21, 2003

(65) Prior Publication Data

US 2003/0197111 A1 Oct. 23, 2003

(30) Foreign Application Priority Data

Jan. 21, 2002 (JP) ........................................ 2002-011312

(51) Int. Cl.$^7$ ................................................ G06F 1/16
(52) U.S. Cl. ........................ 361/681; 361/682; 345/903; 345/905; 248/917
(58) Field of Search ................................ 361/679–681, 361/682, 724–727, 729, 68; 345/903, 905; 349/1, 58–60; 248/817–923; 16/223, 337, 342; 348/838

(56) References Cited

U.S. PATENT DOCUMENTS

| | | | | |
|---|---|---|---|---|
| 5,946,061 A | * | 8/1999 | Kurihara et al. | 349/58 |
| 6,144,423 A | * | 11/2000 | Kim | 349/58 |
| 6,212,067 B1 | * | 4/2001 | Nakajima et al. | 361/681 |
| 6,272,006 B1 | * | 8/2001 | Lee | 361/681 |
| 6,304,432 B1 | * | 10/2001 | Kim | 361/681 |
| 6,411,501 B1 | * | 6/2002 | Cho et al. | 361/681 |
| 6,501,641 B1 | * | 12/2002 | Kim et al. | 361/681 |

* cited by examiner

*Primary Examiner*—Michael Datskovsky
(74) *Attorney, Agent, or Firm*—Pillsbury Winthrop LLP

(57) ABSTRACT

A portable information apparatus comprises a first housing, and a second housing which is mounted to the first housing in such a manner that it can be rocked freely, with its main face facing the first housing, and which includes a panel-like display device with a display screen exposed at the main face and a hinge member to mount the display device in the second housing, wherein the hinge member includes a fixed member fixed to the second housing and an extended member mounted to the fixed member and intervening between the display device and the inner wall of the second housing, and the extended member includes a pressing section which presses against the side face of the display device and a flexible curved section which is provided so as to be continuous with the pressing section and which is formed convexly at the inner wall of the second housing.

15 Claims, 8 Drawing Sheets

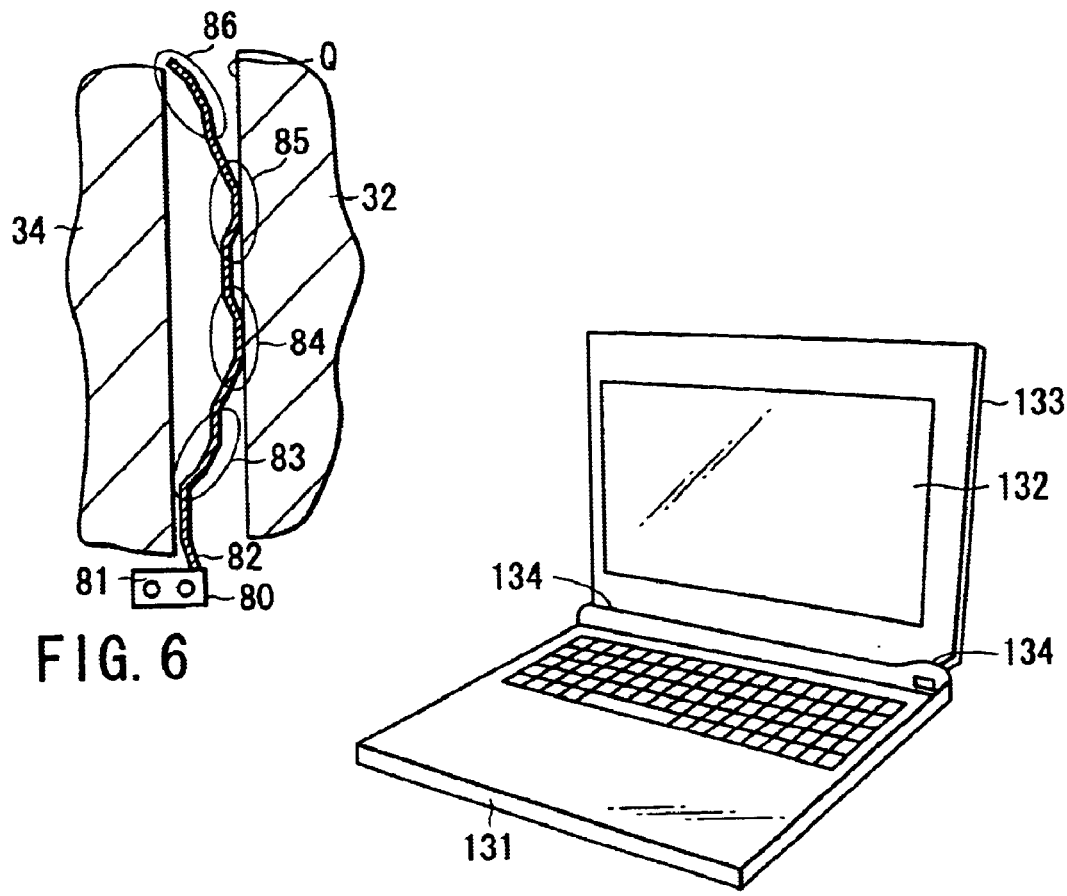
FIG. 6
FIG. 7A
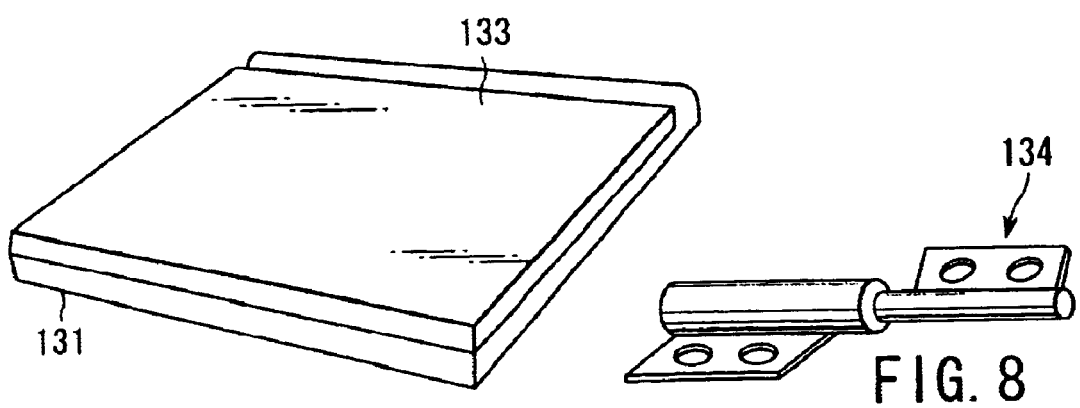
FIG. 7B
FIG. 8

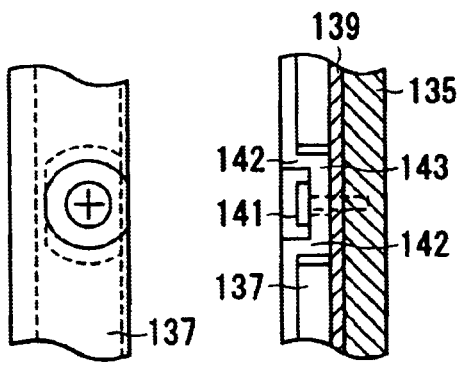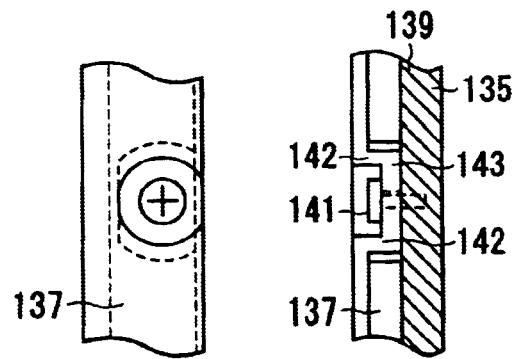
FIG. 11A  FIG. 11B  FIG. 12A  FIG. 12B
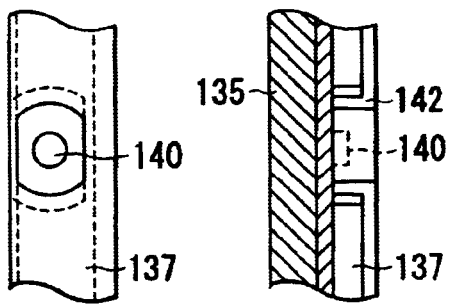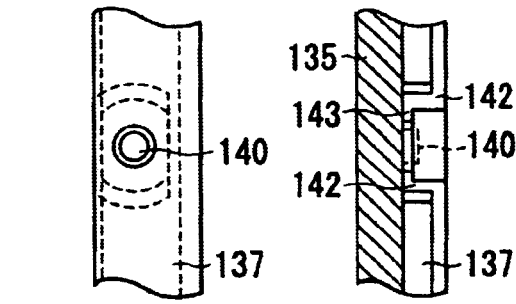
FIG. 13A  FIG. 13B  FIG. 14A  FIG. 14B
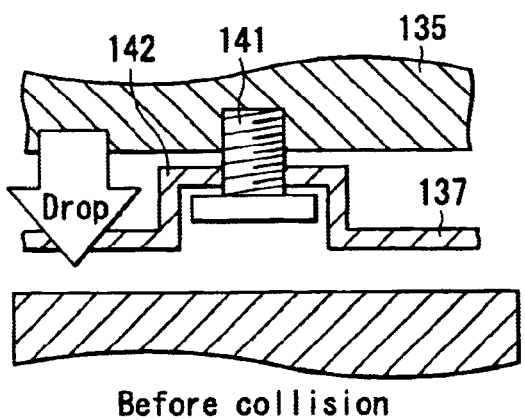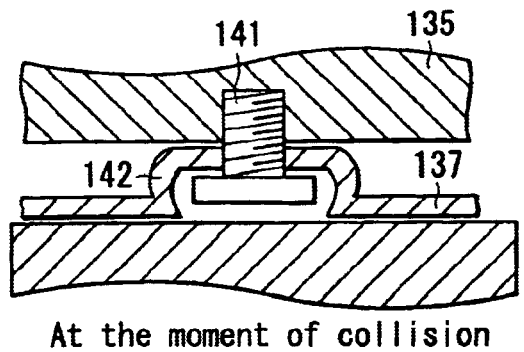
Before collision  At the moment of collision
FIG. 15A  FIG. 15B

PORTABLE INFORMATION APPARATUS

CROSS-REFERENCE TO RELATED APPLICATIONS

This application is based upon and claims the benefit of priority from the prior Japanese Patent Application No. 2002-011312, filed Jan. 21, 2002, the entire contents of which are incorporated herein by reference.

BACKGROUND OF THE INVENTION

1. Field of the Invention

This invention relates to a portable information apparatus with a liquid-crystal display device

2. Description of the Related Art

A portable information apparatus, such as a laptop or a notebook computer or a word processor, is roughly composed of two units as shown in perspective views of FIGS. 7A and 7B. FIG. 7A shows the opened state of the apparatus and FIG. 7B shows the closed state of the apparatus. Specifically, one unit is a body 131 which has the function of inputting, processing, and storing information. The other unit is a display section 133 which has a display screen 132 for displaying information. The body 131 and the display section 133, which are connected electrically with an FPC (Flat Package Cable), electric wires, or the like, are capable of displaying the information from the body freely on the display section 133.

The body 131 and the display section 133 are connected via hinge parts 134 in such a manner that they can be opened and closed freely. The hinge parts 134, whose configuration is shown in FIG. 8, are fixed to the body 131. The display section 133 can therefore be opened and closed freely to the body 131 as needed. Giving suitable friction to the rotating sections of the hinge parts 134 makes it possible to keep the opening angle of the display section 133. That is, the user of the portable information apparatus can do setting, with the display section 133 inclined at an easy-to-see, easy-to-use angle. When the user doesn't use the portable information apparatus, he or she can close the display section 133 in such a manner that the display screen 132 is housed inside the apparatus. As a result, the fragile display screen 132 can be protected.

FIG. 9 is an exploded view of the display section 133. As shown in FIG. 9, the display section 133 is generally composed of a liquid-crystal display device 135 from an energy-saving viewpoint. To protect the liquid-crystal display device 135 from external forces, such as push or drop impact, the display device 135 is contained in a housing 136. The housing 136 is formed in a resin mold made of PC/ABS resin or carbon-fiber-added, glass-fiber-added, or inorganic filler-added PC/ABS resin. Alternatively, the housing 136 is made of magnesium alloy or aluminium alloy. The housing 136 is composed of a cover housing 137 for protecting the surfaces of the liquid-crystal display device 135 excluding the display screen 132 and a frame housing 138 for protecting the periphery of the display screen 132. The liquid-crystal display device 135 is fixed to the cover housing 136 by means of hinge metal fittings 139.

With the body 131 engaged with the display section 133, when the display section 133 is opened, if the hinge metal fittings 139 are supported only by the hinge parts 134, great resistance is produced at the supporting sections, because the supporting sections at which the hinge parts 134 support the display section 133 are short. Consequently, stress is concentrated at the roots of the cover housing 137 supported by the hinge parts 134. Therefore, the repeated opening and closing of the display section 133 can do damage to the roots of the cover housing 137. To avoid this problem, the hinge metal fittings 139 are used structurally so as to act as what is obtained by lengthening the supporting sections of the hinge parts 134 in the direction in which the display section 133 is supported. That is, the cover housing 137 is supported in such a manner that not only area A but also area B of the hinge metal fitting can receive the load imposed when the display section 133 is opened. The hinge metal fitting 139 is formed by cutting a metal plate and bending the resulting plate. In this case, area A screwed to the hinge part 134 provided on the body 131 side and area B mechanically connected to the cover housing 137 and liquid-crystal display device 135 are formed in such a manner that area A and area B are perpendicular to each other. Area B is located in the spacing between the cover housing 137 and the liquid-crystal display device 135 at right and left with respect to the display screen. Area B is screwed to the cover housing 137 and liquid-crystal display device 135 at a plurality of places or is fastened to the latter in a similar manner. The screwed section of area A also has the function of preventing damage.

FIG. 10 is a schematic diagram to help explain the fixing structure using the hinge metal fittings 139. The liquid-crystal display device 135 has two fastening sections formed at symmetrical positions on the side faces. On one side-face side, the fastening section close to the hinge is screwed via the hinge metal fitting 139 to the cover housing 137. On the other side-face side, the fastening section is screwed directly to the cover housing 137 without a hinge metal fitting 139. On the other side-face side, a projecting spacer 140 (shown in FIGS. 11C and 11D explained later) formed at the side face of the liquid-crystal display device 135 is inserted into an engaging hole made in the cover housing 137 and hinge metal fitting 139, thereby engaging with the hole.

FIGS. 11A to 11D are plan views and side views to help explain fastening methods at the fastening sections. The fastening methods are roughly divided into the following three types: (1) a method of fastening the cover housing 137, hinge metal fitting 139, and the liquid-crystal display device 135 together, (2) a method of screwing the liquid-crystal display device 135 and the cover housing 137, and the cover 137 together, and (3) a method of allowing the liquid-crystal display device 135 to move in a specific direction with respect to the hinge metal fitting 139 and cover housing 137.

FIGS. 11A and 11B show the method in item (1). A hole whose diameter is larger than the thread's outside diameter of a screw 141 and smaller than the head of the screw 141. The screw 141 is screwed into a female screw formed at the side face of the liquid-crystal display device 135. At the cover housing 137 of the screw fastening section, a pedestal 143 is formed from an concave portion of a rib 142 so as to prevent the head of the screw from projecting from the cover housing.

FIGS. 12A and 12B show the method in item (2). Since the hinge metal fitting 139 extends only to half of the right and left side faces of the liquid-crystal display device 135, the liquid-crystal display device 135 and the cover housing 137 are screwed together directly at a place to which the screwed section of area A does not reach.

FIGS. 13A, 13B, 14A, and 14B show the method in item (3).

To absorb the variation of tolerance in the liquid-crystal display device 135, the screwing of the liquid-crystal display device 135 and the cover housing 137 used in item (1) and item (2) is done only at either right or left with respect to the display screen 132. On the other hand, on the opposite side, the liquid-crystal display device 135 is designed to be movable with respect to the hinge metal fitting 139 and cover housing 137. That is, the spacer 140 provided on the liquid-crystal display device 135 is guided into the hole (or a long hole) made in the hinge metal fitting 139 and cover housing 137, which enables as much displacement as the variation of tolerance between the hole and the spacer 140.

In the above-described fastening methods, however, the methods in item (1) and item (2) require the pedestal 143 for the head of the screw 141 at the side face of the cover housing 137 as shown in FIGS. 11A, 11B, 12A, and 13B. In the fastening method of allowing the liquid-crystal display device 135 to move as in item (3), since the hole for guiding the spacer 140 is needed where there is no hinge metal fitting 139, the same structure as the pedestal 143 has to be provided. When a pedestal is provided on the right and left side faces of the inside of the cover housing 137, the rib 142 (shown in FIGS. 11B, 12B, and 14B) connected to the pedestal from inside the cover housing 137 is required to secure the strength of the pedestal.

FIG. 15A shows a state of a product before collision. When the product drops in the right-to-left direction with respect to the display screen and the side face of the display section receives impact, the rib 142 fixed with the screw 141 is deformed due to the impact as shown in FIG. 15B showing a state of the product after the collision. Generally, the longer the distance the product moves from when it receives the impact load until its speed decreases to zero, that is, the longer the braking distance, the lower the produced acceleration. However, since the rib 142 stands in the direction in which the product drops, it serves to restrict the displacement of the liquid-crystal display device 135. This gives a high acceleration to the liquid-crystal display device 135, with the result that the liquid-crystal display device 135 can be broken.

BRIEF SUMMARY OF THE INVENTION

An object of the present invention is to provide not only a mounting structure of a liquid-crystal display device which prevents the housing of the display section fixing the hinges from being broken even when the display section is opened and closed repeatedly and improves the drop strength, but also a portable information apparatus using the mounting structure.

To solve the above problems and achieve the object, a portable information apparatus comprising: a first housing; and a second housing which is mounted to the first housing in such a manner that it can be rocked freely, with its main face facing the first housing, and which includes a panel-like display device with a display screen exposed at the main face and a hinge member to mount the display device in the second housing, wherein the hinge member includes a fixed member fixed to the second housing and an extended member mounted to the fixed member and intervening between the display device and the inner wall of the second housing, and the extended member includes a pressing section which presses against the side face of the display device and a flexible curved section which is provided so as to be continuous with the pressing section and which is formed convexly at the inner wall of the second housing.

BRIEF DESCRIPTION OF THE SEVERAL VIEWS OF THE DRAWING

FIG. 6 schematically shows a hinge member according to a fourth embodiment of the present invention;

FIG. 7A is a perspective view of the portable information apparatus, with the display section opened, and FIG. 7B is a perspective view of the portable information apparatus, with the display section closed;

FIG. 8 shows the configuration of a hinge part;

FIGS. 11A and 11B are a side view and a plan view of a conventional fastening section, respectively;

FIGS. 12A and 12B are a side view and a plan view of another conventional fastening section, respectively;

FIGS. 13A and 13B are a side view and a plan view of still another conventional fastening section, respectively;

FIGS. 14A and 14B are a side view and a plan view of still another conventional fastening section, respectively; and FIG. 15A is a schematic diagram of a state of a product before a collision and FIG. 15B is a schematic diagram of a state of the product after the collision.

DETAILED DESCRIPTION OF THE INVENTION

Figure 1A:
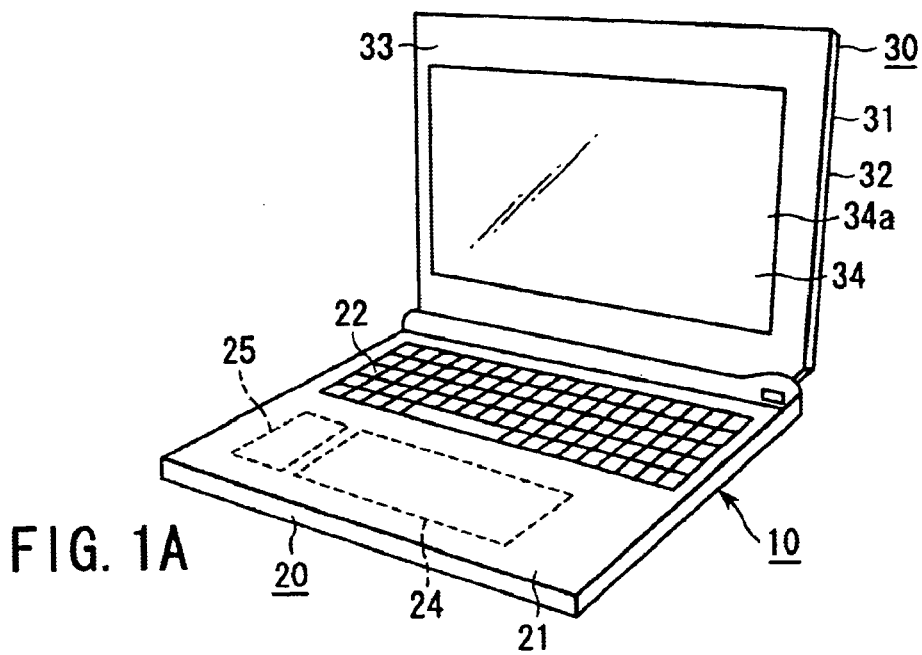
FIG. 1A is a perspective view of a portable information apparatus according to a first embodiment of the present invention.

FIG. 1A shows a portable information apparatus 10, such as a laptop or a notebook personal computer or a word processor. As shown in FIG. 1A, the portable information apparatus 10 includes a first body 20 and a second body 30 joined with each other in such a manner that they can be opened and closed. The first body 20, which has a box-like body housing 21, includes not only a keyboard 22 and an input device, such as a pointing device, but also a CPU-carrying motherboard 24 and a hard disk 25.

The second body 30 has a display section housing 31. The display section housing 31 is composed of a box-like cover housing 32 with its top opened and a frame housing 33 to be mounted in the opening of the cover housing 32. Inside the display section housing 31, a liquid-crystal display device 34 for displaying information is housed. In the figure, numeral 34a indicates the display screen of the liquid-crystal display device, 34b indicates the left side face, and 34c indicates the right side face.

Figure 1B:
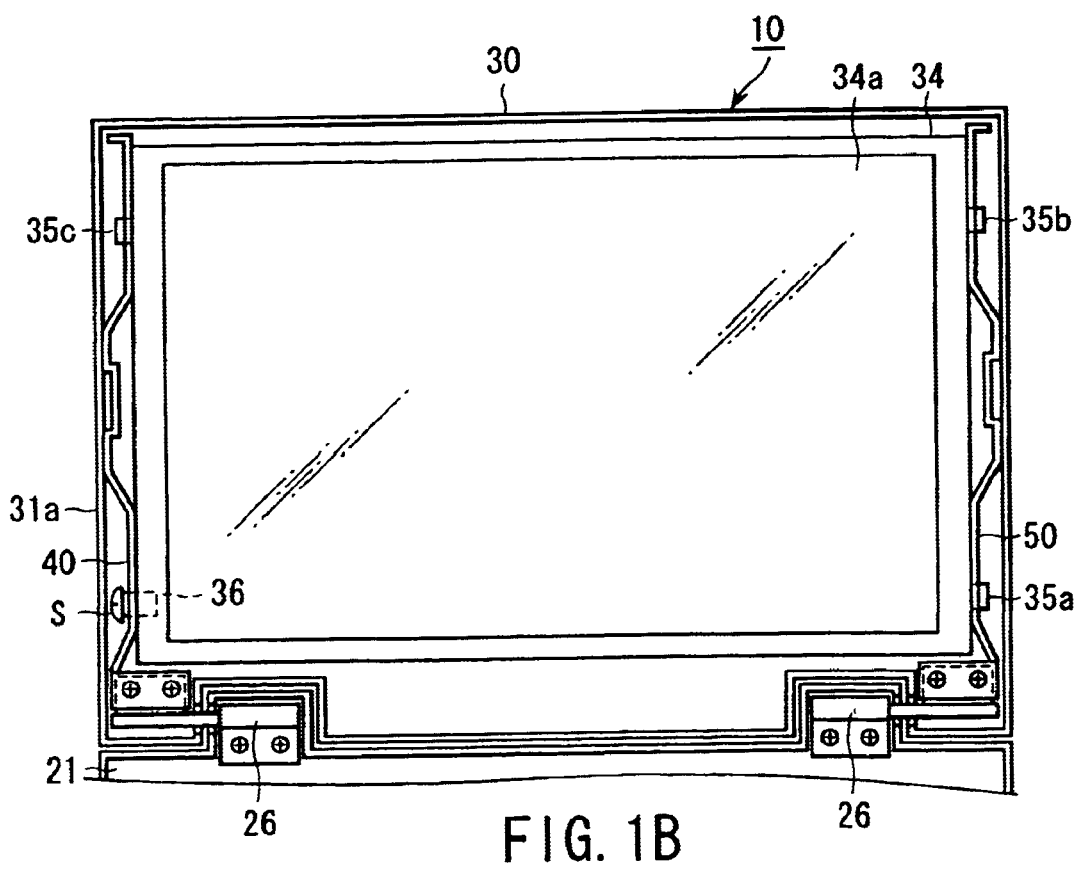
FIG. 1B is a plan view of the main part of the portable information apparatus.
Figure 1C:
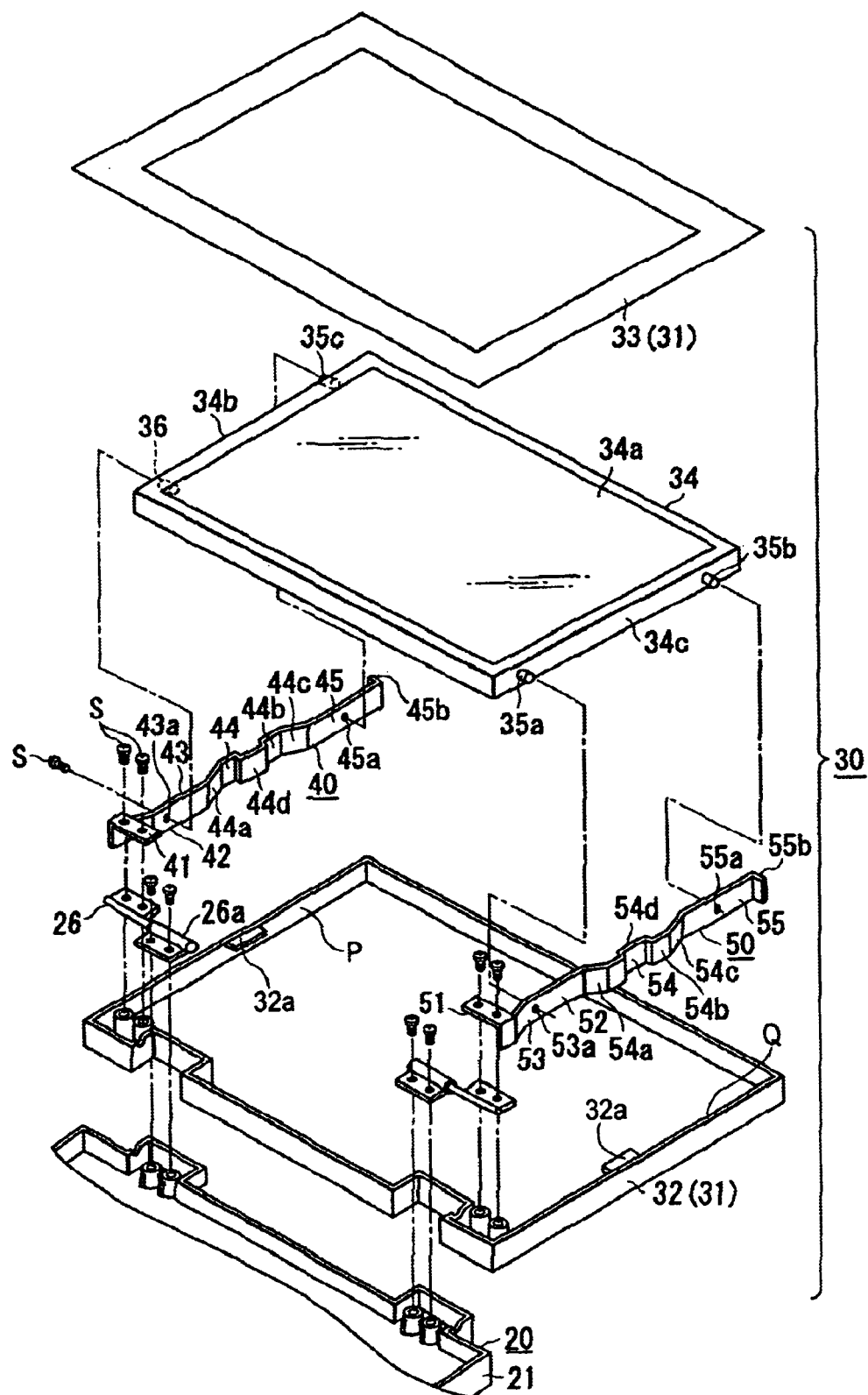
FIG. 1C is an exploded perspective view of the main part of the portable information apparatus.

The body housing 21 and the display section housing 31 are joined with each other via hinge parts 26 shown in FIG. 1C in such a manner that they can be opened and closed. When the portable information apparatus is not used or is being carried, closing the body housing 21 and the display section housing 31 so as to stack them one on top of the other enables the display screen 34a of the liquid-crystal display device 34 to be protected. Giving suitable friction to the rotating mechanisms 26a of the hinge parts 26 makes it possible to keep the opening angle of the second body 30.

The motherboard 24 and the liquid-crystal display device 34 are connected electrically by means of FPC (Flat Package Cable), electric wires, or the like.

FIG. 1B is a plan view of the liquid-crystal display device 34 mounted in the cover housing 32. In FIG. 1B, cylindrical projecting sections 35a, 35b are formed close to the upper end and the lower end, respectively, at the right side face of the liquid-crystal display device 34. A cylindrical projecting section 35c is formed close to the upper end at the left side face 34b. In addition, a female screw 36 is provided close to the lower end at the left side face 34b of the liquid-crystal display device 34 in FIG. 1B.

In FIG. 1B, numerals 40, 50 indicate hinge members made of elastic metal material (e.g., SUS). The hinge member 40 includes a fixed member 41 screwed to the cover housing 32 by means of a male screw S and an extended member 42 which is formed integrally with the fixed member 41 and provided along the spacing between the side face of the liquid-crystal display device 34 and the inner wall P of the cover housing 32.

The extended member 42 is composed of a first flat plate section 43, a curved section 44, a second flat plate section 45. The first flat plate section 43 extend almost parallel to the left side 34b of the liquid-crystal display device 34 and has at least one part contacting the left side 34b of the device 34. The curved section 44 is continuous with the first flat plate 43. The second flat plate section 45 extends almost parallel to the left side 34b of the device 34 and has at least one part contacting the left side 34b of the device 34. The first flat plate section 43 has a hole 43a. A male screw S lies in the hole 43a and set in screw engagement with the female screw 36 of the liquid-crystal display device 34. The curved section 44 has a ridge section 44a, a flat top section 44b, and a ridge section 44c. The ridge section 44a extends the first flat plate section 43, slantwise to the inner wall P. The flat top section 44b is continuous with the ridge section 44a and has at least one part contacting the inner wall P. The ridge section 44c is continuous with the top section 44b, extends slantwise to the inner wall P and is coupled to the second flat plate section 44. At the top section 44b, a concave section 44d is formed. In addition, the second flat plate section 45 has a hole 45a. The projecting section 35c of the liquid-crystal display device 34 is inserted in the hole 45a and can freely side in the hole. A rib 45b is provided at the tip of the second flat plate section 45.

The hinge member 50 includes a fixed member 51 screwed to the cover housing 32 by means of a male screw S and an extended member 52 which is formed integrally with the fixed member 51 and provided along the spacing between the side face of the liquid-crystal display device 34 and the inner wall Q of the cover housing 32.

The extended member 52 is composed of a first flat plate section 53, a curved section 54, and a second flat plate section 55. The flat plate section 53 extend almost parallel to the right side 34c of the liquid-crystal display device 34 and has at least one part contacting the right side 34c of the device 34. The curved section 54 is continuous with the first flat plate 53. The second flat plate section 55 extends almost parallel to the right side 34c of the device 34 and has at least one part contacting the right side 34c of the device 34. The first flat plate section 53 has a hole 53a. The projecting section 35c of the liquid-crystal display device 34 is inserted in the hole 53a and can freely slide in the hole 53a. The curved section 54 has a ridge section 54a, a flat top section 54b, and a ridge section 54c. The ridge section 54a extends from the first flat plate section 53, slantwise to the inner wall P. The flat top section 54b is continuous with the ridge section 54a and contacts the inner wall Q. The ridge section 54c is continuous with the top section 54b, extends slantwise to the inner wall P and is coupled to the second flat plate section 54. At the top section 54b, a concave section 54d is formed. In addition, a hole 55a is made in the second flat plate section 55. The projecting section 35c of the liquid-crystal display device 34 is inserted into the hole 55a in such a manner that it slides freely into the hole. A rib 55b is provided at the tip of the second flat plate section 55.

The extended sections 42, 52 enable both of the side faces 34b, 34c of the liquid-crystal display device 34 to be held elastically against the cover housing 32.

The shape of the curved sections 44, 54 of the hinge parts 40, 50 has only to be capable of giving nearly uniform elasticity in both of the right and left directions in such a manner that both of the side faces 34b, 34c of the liquid-crystal display device 34 become parallel with the inner walls P, Q of the cover housing 32. As described above, a trapezoid shape with no base in its side view has only to be formed at each of the inner walls in such a manner that the shape projects toward the inner wall. If this is the case, the top sections 44b and 54b contact the inner walls P and Q of the cover housing 32. Although the ridge portions 44a, 44c, 54a and 54c may be curved, not straight, the top sections 44b and 54b should better be flat and straight, extending almost parallel to the inner walls P and Q. More than one top section may be provided for each inner wall.

The hinge parts 40 and 50 may be shaped such that the line connecting the point where either contacts a side of the display device 34 and the point where either contacts or lies nearest the inner surface of the device 34 inclines to the side of the device 43, not perpendicular to the side of the device 43.

The hinge parts 40 and 50 may have only one ridge portion. (The hinge part 40, for example, may be cut at the concave section 44d.)

The top sections 44b and 54b contact the inner walls P and Q. Instead, they may be coupled to the inner walls P and Q by spacers or the like. The present invention can be applied not only to liquid crystal displays, but also to all portable displays for use in portable information apparatus, such as EL (Electro Luminescent) displays, PDs (Plasma Displays) and FEDs (Field Emission Displays).

Projecting rib tongues 32a for locking the top sections 44b, 54b of the hinge parts 40, 50 are formed at the cover housing 32. The tongues 32a prevent the liquid-crystal display device 34 from coming off the cover housing 32. The ribs 45b, 55b of the hinge members 40, 50 function as stoppers when the liquid-crystal display device 34 is moved by external forces.

With the above configuration, when the display section of the liquid-crystal display device 34 drops in the right-to-left direction with respect to the display screen, with the liquid-crystal display device 34 mounted in the cover housing 32, acceleration produced in the liquid-crystal display device 34 can be decreased, because the curved section 44, 54 of the hinge members 40, 50 are distorted toward the liquid-crystal display device 34.

Figure 2:
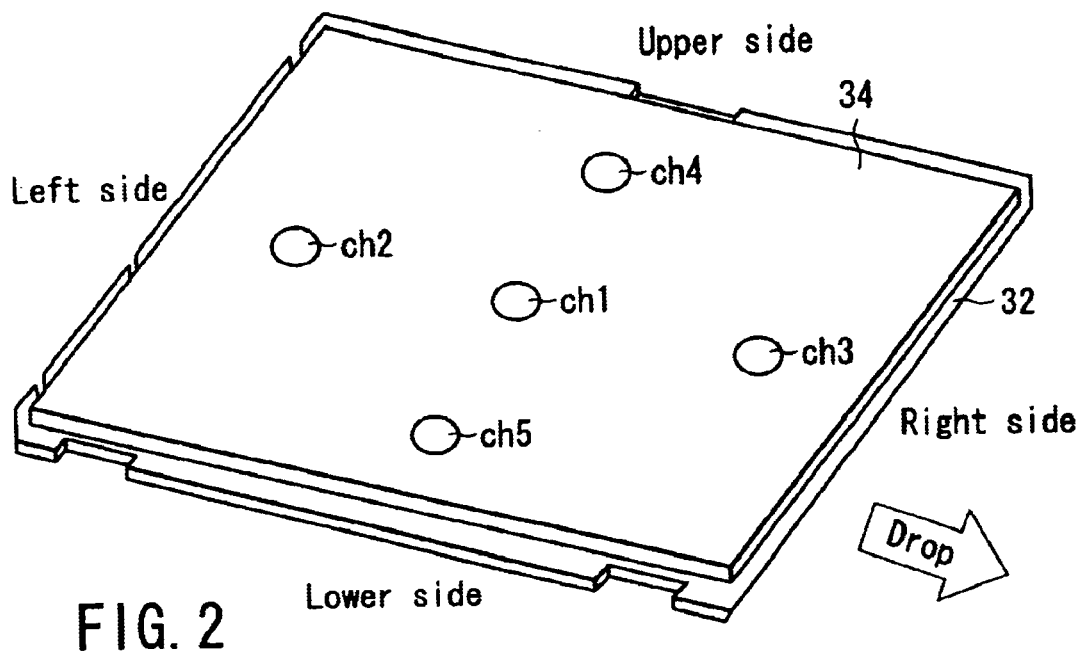
FIG. 2 is a perspective view of a liquid-crystal display device mounted in a cover housing.

As shown in the perspective view of FIG. 2, when the liquid-crystal display device 34 mounted in the cover housing 32 in each of the embodiment and the prior art was dropped from a height of 100 mm and the right side face 34c collided with the display screen of the liquid-crystal display device 34, drop impact analysis was made to find acceleration in the direction of drop produced in the liquid-crystal display device 34. In FIG. 2, ch1 to ch5 indicate the measuring positions of acceleration G.

Figure 3A:
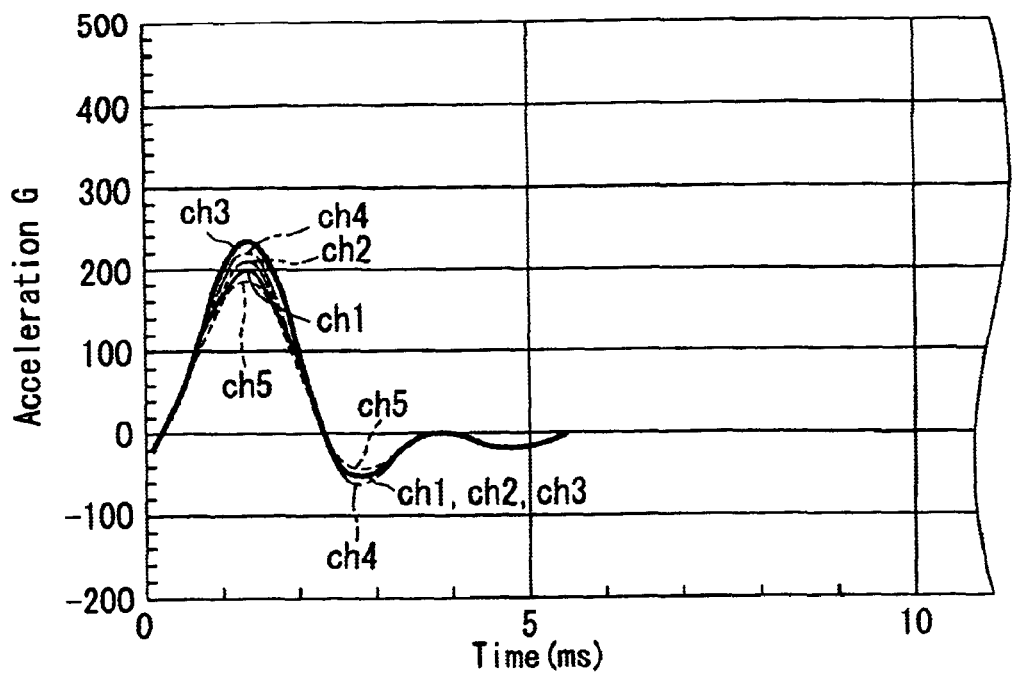
FIG. 3A is a graph for a history of acceleration in a conventional structure by drop impact analysis and FIG. 3B is a graph for a history of acceleration in a structure according to the present invention.
Figure 3B:
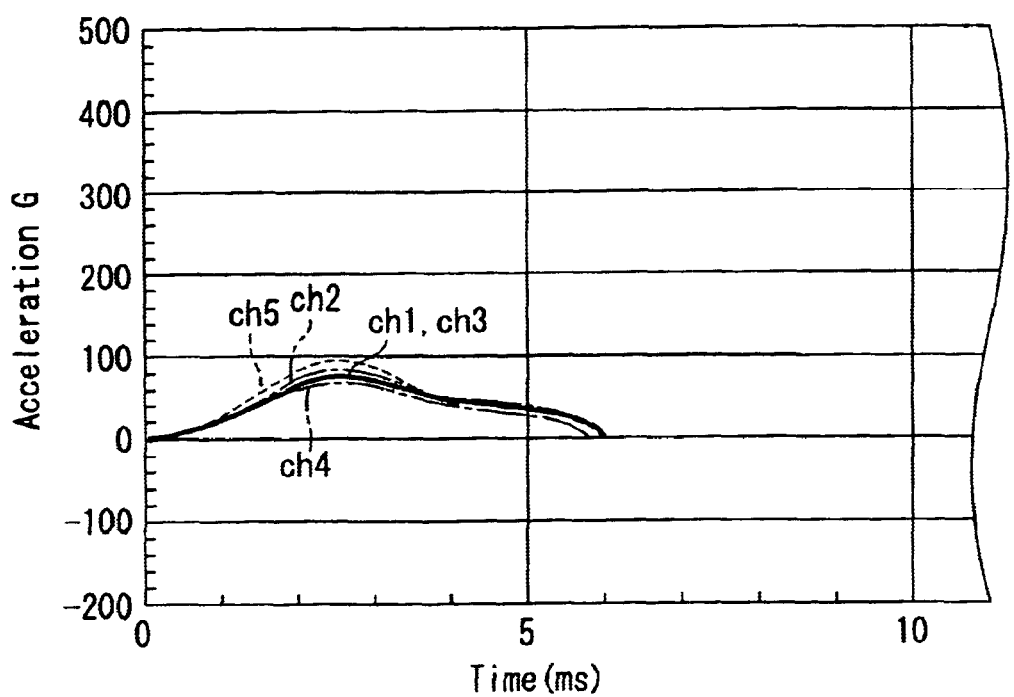
Figure 9:
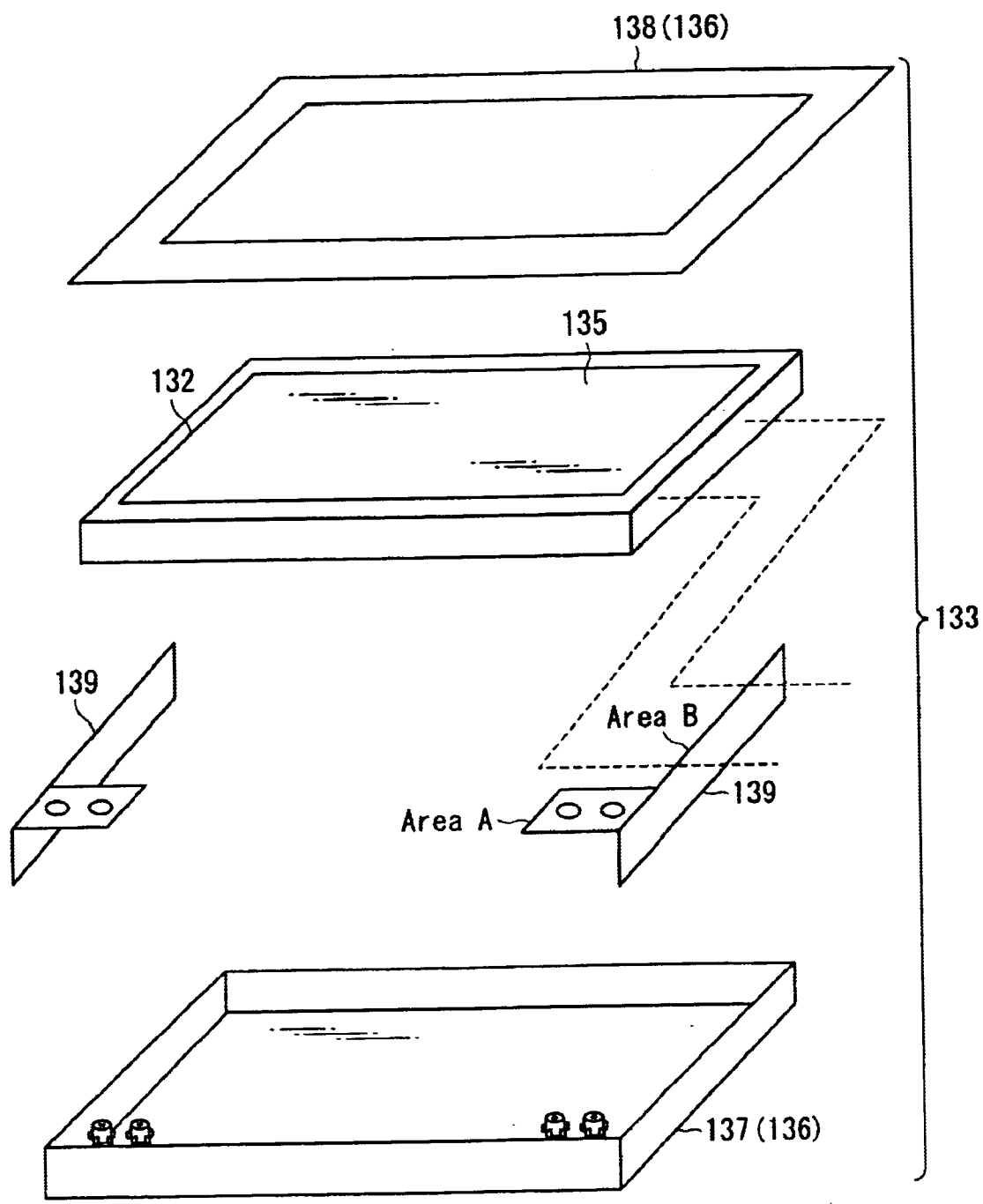
FIG. 9 is an exploded view of a conventional display section.
Figure 10:
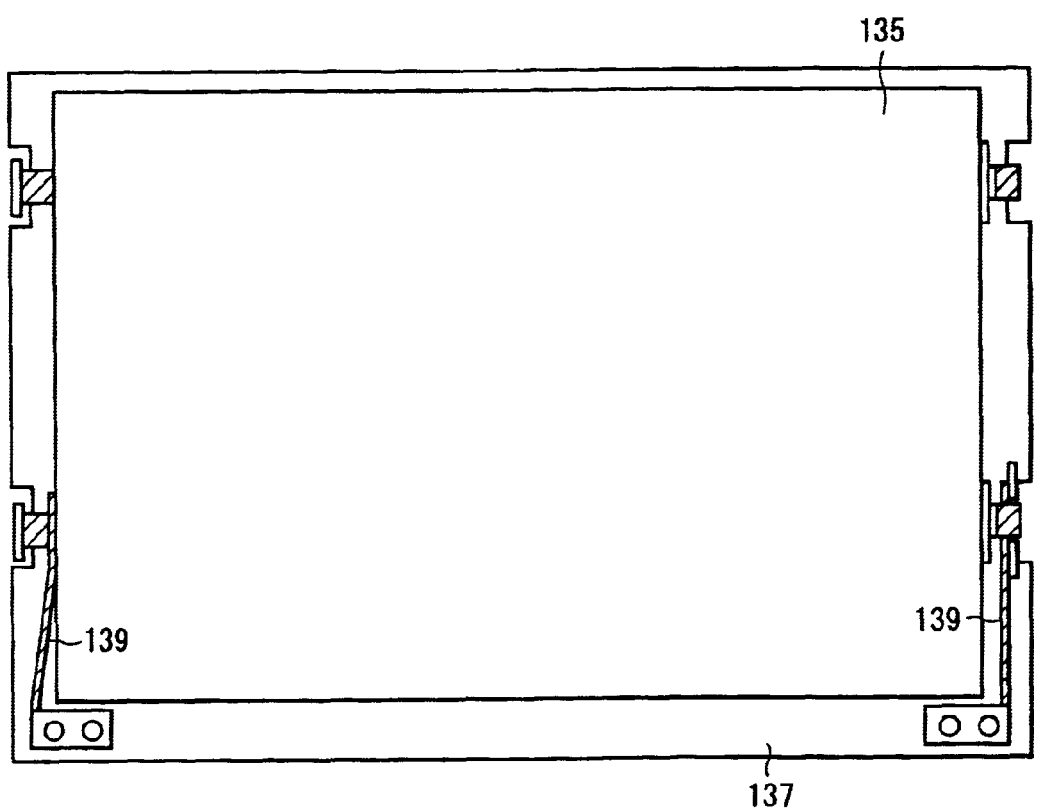
FIG. 10 is a schematic explanatory diagram of a fixing structure using conventional hinge metal fittings.

FIG. 3A is a graph showing a history of acceleration in the prior art structure. FIG. 3B is a graph showing a history of acceleration in the above-described structure. The abscissa axis indicates time and the ordinate axis indicates acceleration. In both of the graphs, similar trends were measured at ch1 to ch5. It is clear that acceleration is lower in the structure of the embodiment shown in FIG. 3B.

The result of the comparison has shown that changing the conventional structure in FIG. 3A to the structure of the embodiment in FIG. 3B makes it possible to almost halve the maximum value of the acceleration and therefore alleviate the impact against the liquid-crystal display device 34 remarkably.

In the portable information apparatus 10, of the left and right hinge members 40, 50, only the hinge member 40 is screwed to the liquid-crystal display device 34 and the projecting parts 35a, 35b provided on the liquid-crystal display device 34 are guided and inserted into the holes 53a, 55a in the hinge member 50. Therefore, when the second body 30 is manufactured by combining the two types of hinge parts, the assembly tolerance of the parts can be absorbed.

The projecting tongue 32a is provided on each of the right and left inner side faces of the cover housing 32 in such a manner that the tongue is formed as a part of the cover housing 32. The tongues 32a are designed to be covered by the concave sections 44d, 54d formed at the top of the trapezoid of the top sections 44b, 54b of the hinge members 40, 50. This prevents the hinge members 40, 50 and liquid-crystal display device 34 from separating from and coming off the cover housing 32.

Furthermore, the ribs provided on the cover housing 32 restrict the displacement of the free tips of the hinge members 40, 50 in the longitudinal direction of the hinge members 40, 50. This enables both of the screwed places and the places locked by the ribs to receive impact, when the display section drops vertically toward the display screen. Consequently, the impact on the screwed places is alleviated, which prevents the screwed places from being damaged.

As described above, in the portable information apparatus 10 according to the first embodiment, the hinge members 40, 50 enable the liquid-crystal display device 34 not only to be used as means for being mounted in the cover housing 32 but also to add the function of withstanding external vibration or impact.

Figure 4:
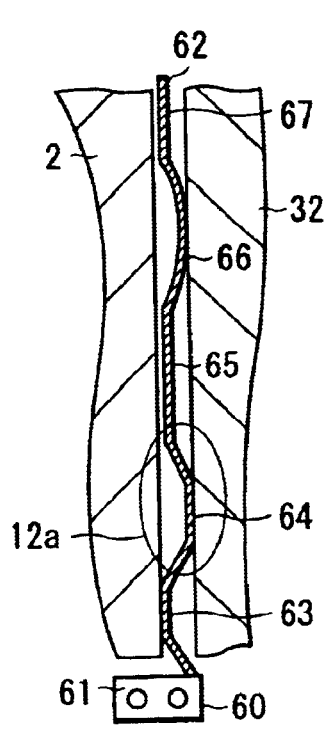
FIG. 4 schematically shows a hinge member according to a second embodiment of the present invention.

FIG. 4 schematically shows a second embodiment of the present invention. In the second embodiment, a hinge member 60 is used in place of the hinge members 40, 50. The hinge member 60 includes a fixed member 61 screwed to the cover housing 32 by means of a male screw S and an extended member 62 which is formed integrally with the fixed member 61 and provided along the spacing between the side face of the liquid-crystal display device 34 and the inner wall Q of the cover housing 32.

The extended member 62 is composed of a first flat plate section 63 provided so as to make close contact with the right side face 34c of the liquid-crystal display device 34, a first curved section 64, a second flat plate section 65, a second curved section 66, and a third flat plate section 67. Specifically, in the second embodiment, the spring force of the hinge member 60 is produced in such a manner that the force is distributed to the first and second curved sections 64, 66 according to the number of the curved sections. That is, the larger the number of curved sections, the higher the rigidity of the hinge member 60 against drop impact, since more springs are arranged in parallel. When a dropping height is large, or when the mass of the liquid-crystal display device 34 is large, high rigidity is required. In contrast, when the dropping height is small, or when the mass of the liquid-crystal display device 34 is small, low rigidity is required, because too high rigidity does not provide a suitable spring characteristic. That is, when a uniform curve is given to the hinge member 60, the number of curved sections has only to be determined according to the required rigidity.

Figure 5:
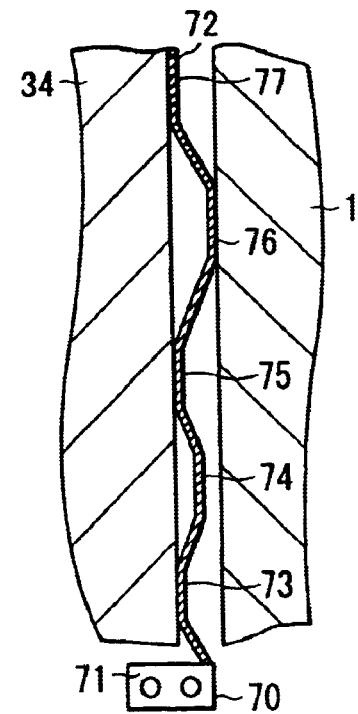
FIG. 5 schematically shows a hinge member according to a third embodiment of the present invention.

FIG. 5 schematically shows a third embodiment of the present invention. In the third embodiment, a hinge member 70 is used in place of the hinge members 40, 50.

The hinge member 70 includes a fixed member 71 screwed to the cover housing 32 by means of a male screw S and an extended member 72 which is formed integrally with the fixed member 71 and provided along the spacing between the side face of the liquid-crystal display device 34 and the inner wall Q of the cover housing 32.

The extended member 72 is composed of a first flat plate section 73 provided so as to make close contact with the right side face 34c of the liquid-crystal display device 34, a first curved section 74, a second flat plate section 75 provided so as to make close contact with the right side face 34c of the liquid-crystal display device 34, a second curved section 76, and a third flat plate section 77 provided so as to make close contact with the right side face 34c of the liquid-crystal display device 34.

In the third embodiment, it is assumed that, when the portable information apparatus 10 drops, there are two cases: one case where the apparatus 10 falls from a small height (that is, the hinge with a low rigidity is required) and the other case where the apparatus 10 falls from a large height (that is, the hinge with a high rigidity is required).

Under this assumption, a first and a second curved section 74, 76 differing in size are formed in the hinge member 60 as shown in FIG. 5. When the dropping height is small, the second curved section 76 functions as a spring. When the dropping height is large, the second curved section 76, together with the first curved section 74, functions as a spring. As a result, the rigidity of the hinge member 70 can be changed according to the dropping height. Of course, the number of types of curved sections the single hinge member 70 has is not limited to two and further the number of curved sections is not limited to two. In the ridge sections of the curved sections of the hinge member 70, the steeper their slope, the higher the rigidity of the spring. For example, the slope of the second curved section 76 is made steeper than that of the first curved section 74. This makes the rigidity of the spring of the second curved section 76 higher.

FIG. 6 schematically shows a fourth embodiment of the present invention. In the fourth embodiment, a hinge member 80 is used in place of the hinge members 40, 50.

While in the first to third embodiments, a trapezoid curved section has been formed, a trapezoid curved section is not formed in the hinge member 80. Specifically, the hinge member 80 includes a fixed member 81 screwed to the cover housing 32 by means of a male screw S and an extended member 82 which is formed integrally with the fixed member 81 and provided along the spacing between the side face of the liquid-crystal display device 34 and the inner wall Q of the cover housing 32.

The extended member 82 is so formed that first to fourth arc-like curved sections 83 to 86 describe a large arc. All of the convex side of the arc is on the inner wall Q side. In this case, the top section 84a of the second curved section 84 and the top section 86a of the fourth curved section 86 make contact with the cover housing 32. With this structure, as the dropping height increases, the curved sections functioning as a spring also increases, both of a large dropping height and a small dropping height can be dealt with.

As described above, according to the above embodiments, since the side faces of the liquid-crystal display device 34 are supported elastically and fixed to the cover housing 32, the cover housing 32 to which the hinges are fixed will not be broken, even when the display section is opened and closed repeatedly. Furthermore, with the above structure, the drop strength is improved.

Therefore, even when a portable information apparatus, such as a laptop or notebook personal computer or a word processor, undergoes vibration or impact from the outside world, it is possible to prevent the apparatus from being damaged heavily.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable information apparatus comprising:

a first housing; and a second housing which is mounted to the first housing in such a manner that it can be rocked freely, with its main face facing the first housing, and which includes a panel-like display device with a display screen exposed at the main face and a hinge member to mount the display device in the second housing, wherein the hinge member includes a fixed member fixed to the second housing and an extended member mounted to the fixed member and intervening between the display device and the inner wall of the second housing, and the extended member includes a pressing section which presses against the side face of the display device and a flexible curved section which is provided so as to be continuous with the pressing section and which is formed convexly at the inner wall of the second housing.

2. The portable information apparatus according to claim 1, wherein the pressing section is screwed to the display device.

3. The portable information apparatus according to claim 1, wherein the curved section has a ridge section continuous with the pressing section and a top section pressing against the inner wall of the second housing.

4. The portable information apparatus according to claim 1, wherein the second housing has a locking member formed thereon for locking the hinge member.

5. A portable information apparatus comprising:

a first housing; and a second housing which is mounted to the first housing in such a manner that the second housing can be rocked against the first housing, and which includes a panel-like display device, and at least one hinge member which is arranged between the display device and the inner wall of the second housing, wherein the hinge member includes at least a first part which presses against the side face of the display device, a second part which presses against or comes closest to the inner wall of the second housing, and a ridge part which couples the first part to the second part, with a straight line connecting the first part to the second part being inclined to the side face of the display device.

6. The portable information apparatus according to claim 5, wherein the portable information apparatus is a personal computer.

7. The portable information apparatus according to claim 5, wherein the panel-like display device is a liquid-crystal display device.

8. The portable information apparatus according to claim 5, wherein the second part presses against the inner wall of the second housing.

9. The portable information apparatus according to claim 5, wherein the ridge part is straight.

10. The portable information apparatus according to claim 5, further comprising a second ridge part which is continuous with the second part and extends diagonally toward the side face of the display device.

11. The portable information apparatus according to claim 5, further comprising a second ridge part which is continuous with the second part and extends diagonally toward the side face of the display device and a third part which presses against the side face of the display device.

12. The portable information apparatus according to claim 5, wherein the first part is parallel with the side face of the display device.

13. The portable information apparatus according to claim 5, wherein the hinge member is fixed to the second housing.

14. The portable information apparatus according to claim 5, wherein the hinge member is screwed to the second housing.

15. The portable information apparatus according to claim 5, wherein the hinge member is provided on both side faces of the display device.

* * * * *